Aug. 21, 1956

G. B. MARSDEN 2,759,202

TRANSFER AND FEED MECHANISM FOR MULTIPLE DIE THREADING MACHINE

Filed Aug. 2, 1952

INVENTOR:
George B. Marsden,
BY
Bair, Freeman & Molinare
ATTORNEYS.

2,759,202

Patented Aug. 21, 1956

2,759,202

TRANSFER AND FEED MECHANISM FOR MULTIPLE DIE THREADING MACHINE

George B. Marsden, Chicago, Ill., assignor to Chicago Nipple Manufacturing Company, Cicero, Ill., a corporation of Delaware Application August 2, 1952, Serial No. 302,305

24 Claims. (Cl. 10—91)

This invention relates to feeding mechanism for nipple threading machines and the like, and more particularly to a mechanism to feed work pieces into threading or other working heads and to reverse the work pieces for threading or working at both ends thereof.

The mechanism of the present invention is particularly adapted to the threading of pipe nipples and will be described in connection therewith. It will be understood, however, that many of the features of the invention are applicable to other operations or to other types of work pieces.

In threading nipples rotating heads are employed and the blanks are fed into the heads to be threaded at one end and are then reversed and fed into the heads to be threaded at the opposite end. In manual operations this means that each blank must be handled twice so that the operation becomes very slow and tedious. Automatic machines as heretofore proposed for feeding and reversing nipples have been complicated and expensive, and have required complicated controls to maintain the desired sequence of operations.

It is one of the objects of the present invention to provide a feeding mechanism which will effectively feed and reverse work pieces, and which is simple and inexpensive, and requires a small number of simple controls whose operation is accurately synchronized to carry out the desired sequence.

Another object is to provide a feeding mechanism in which work piece are fed by gravity into and through the machine. According to one feature, two vertically displaced rotors are employed to handle work pieces, and the pieces are reversed in passing from the upper to the lower rotor.

Still another object is to provide a feeding mechanism in which a single set of clamp jaws is employed in connection with each rotor to grip a work piece held by the rotor in a horizontal position.

A still further object is to provide a feeding mechanism in which the rotor is turned in a step by step manner, and the jaws associated therewith are operated by the same motor.

A further object is to provide a feeding mechanism in which the rotors detachably carry simple and inexpensive work holders which are easily changed for different sized work pieces.

According to one feature, the holders may be simple tubes to receive work pieces and carry them around the rotors and which are cut out at their sides so the clamp jaws can engage the work pieces. For short nipples the holders are preferably pins over which the nipples are slipped.

Still another object is to provide a feeding mechanism in which the work pieces are retained in the holders by guard strips mounted adjacent to the rotors. The guard strips preferably include a movable vane between the rotors to guide the work pieces in transfer thereof from one rotor to the other.

Another object is to provide a feeding mechanism in which stationary guide means are employed through which the work pieces are moved toward the heads and a movable strip is slidably carried by the stationary guides and is formed with shutter plates movable into and out of registry with the work pieces to control movement thereof.

A further object is to provide a feeding mechanism in which the work pieces are fed toward the heads initially with a relatively large force, and the force is reduced after the heads have started to work on the work pieces. In the preferred construction, two weights are employed to urge the work pieces toward the heads, and one of the weights is engaged and held by stops after a predetermined initial movement.

A still further object is to provide a feeding mechanism in which the heads are tripped by external tripping means positively operated by movement of the work pieces toward the heads.

According to one feature, the work pieces are returned and the heads are reset by a motor connected to the tripping mechanism and to the work piece carriage through lost motion connections.

A still further object is to provide a feeding mechanism in which simple controls are employed operated by movement of the machine parts.

The above and other objects and features of the invention will be more readily apparent from the following description taken in conjunction with the following drawings, in which.

Figure 1:
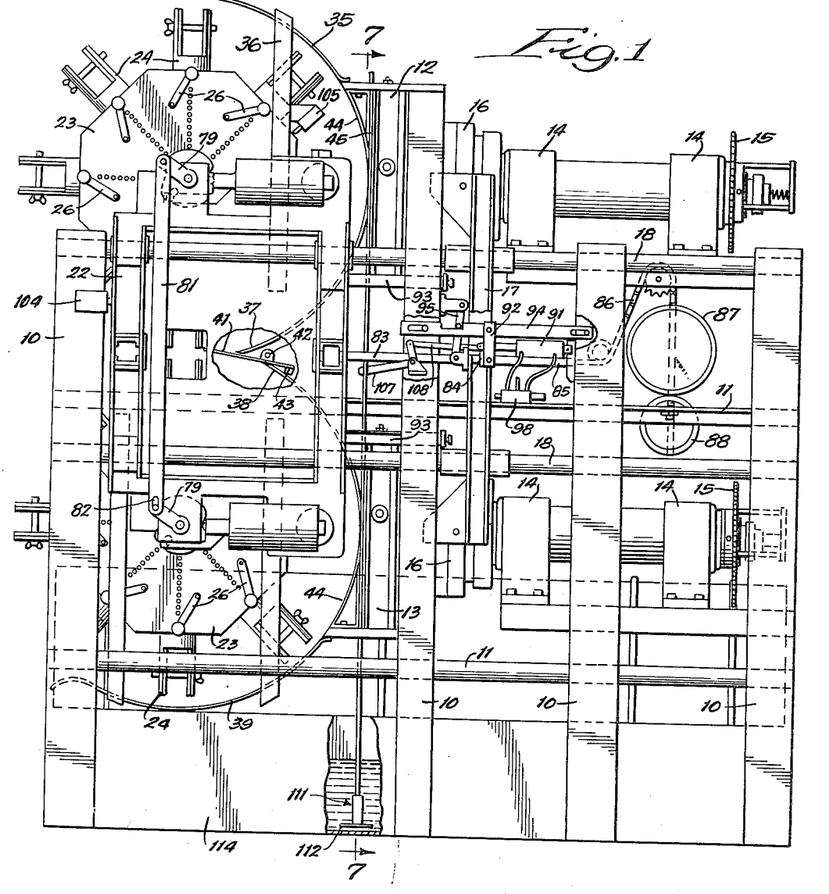
Figure 1 is a side elevation of a nipple threading machine embodying the invention.

The invention is illustrated in connection with a complete nipple threading machine having an automatic feeding mechanism according to the invention associated therewith. As shown in Figure 1, the complete machine comprises a fixed frame including four uprights 10 connected by cross bars 11 to form a complete rigid frame structure. All of the machine parts are carried by this frame structure in a very compact arrangement.

*The head and tripping mechanism*

The frame carries near one end thereof a pair of threading heads 12 and 13 which are mounted one above the other with their axes lying in a vertical plane. The heads are suported by pillow blocks 14 on the frame and may be driven through sprockets 15 connected therewith. The driving mechanism for the sprockets is not shown but may be a conventional motor connected to the sprockets through one or more chains.

The heads may be threading heads of conventional construction having chasers pivotally mounted therein to move from an inner cutting position to an outer tripped position in which the threaded pieces may be removed axially therefrom without requiring unscrewing. Preferably the usual internal tripping mechanism is omitted and the heads are tripped by axially shiftable rings 16 thereon. The rings 16 are shown shifted to the left to the head closing position, and to trip the heads to open the chasers they are moved to the right. To move the tripping rings a tripping bar 17 is provided which may be in the form of a pair of vertical beam members slidably supported for horizontal movement on fixed rods 18 on the frame.

Adjacent to the heads 12 and 13 the beams 17 carry plates 19 which lie on opposite sides of the heads and each of which carries a plurality of inwardly extending pins 21 of different lengths and spaced horizontally.

When different sized heads are employed the appropriate ones of the pins 21 may be fitted into the tripping rings 16 thereof so that the entire tripping mechanism need not be changed each time the heads are changed. With this construction the threading heads can be easily changed with a minimum of changes in the remainder of the mechanism.

The rotors

Figures 6, 7:
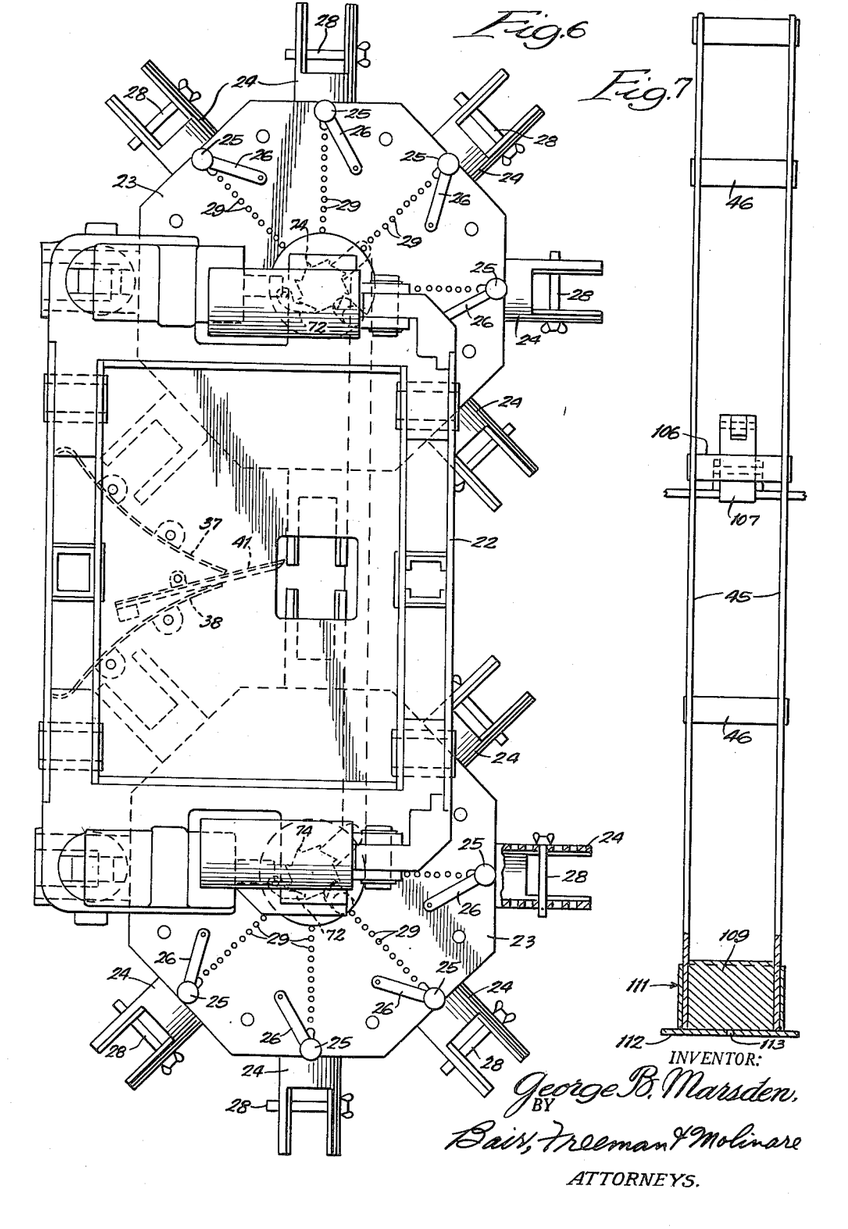
Figure 6 is an enlarged side elevation of the carriage and heads.
Figure 7 is a partial section on the line 7—7 of the adjustable guard strip.

Work pieces to be threaded or otherwise treated are fed into the heads by means of transport rotors which are carried by a carriage 22 slidable in a generally horizontal direction on the rods 18 near the left end of the machine as seen in Figure 1. The carriage is generally rectangular as seen in Figures 1 and 6, and carries two rotors which are rotatable on vertically displaced horizontal axes in alignment with the axes of the heads respectively. Thus each rotor will carry work pieces to one of the heads and in the operation of the rotors the work pieces will be reversed so that both ends thereof will be threaded. As shown, the heads are on horizontal axes and the carriage moves horizontally toward the heads but it will be apparent that the head axes and the line of movement of the carriage could be at an appreciable angle to horizontal and still maintain precisely the same operation. Reference to horizontal herein will therefore be understood to include an angle to horizontal within the working limits of the machine.

Figures 8, 9, 10, 11, 12, 13, 14, 15:
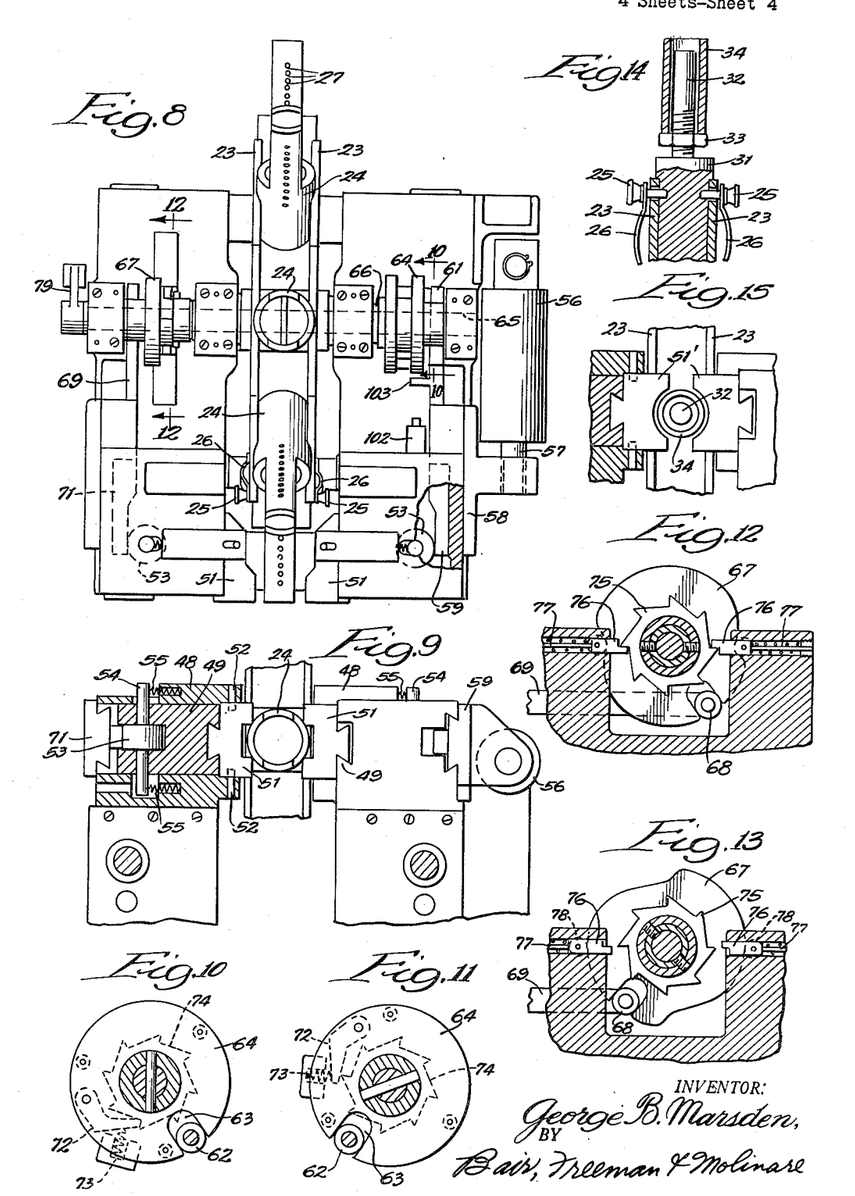
Figure 8 is a partial top plan view of the carriage and heads with parts broken away and in section.
Figure 9 is a front elevation showing the clamping jaws with parts in section.
Figure 10 is a partial section on the line 10—10 of Figure 8.
Figure 11 is a view similar to Figure 10, showing a different position.
Figure 12 is a partial section on the line 12—12 of Figure 8.
Figure 13 is a view similar to Figure 12, showing a different position.
Figure 14 is a partial section through a rotor, showing an alternative work holder.
Figure 15 is a partial view similar to Figure 9 of the alternative work holder of Figure 14.

The rotors as best seen in Figures 6 and 8, are formed by flat plates 23 mounted in spaced parallel relationship to receive between them a plurality of work holders. Preferably cylindrical work holders are employed and the inner sides of the plates 23 may be grooved to receive the work holders and hold them in radial position between the plates. Any desired number of work holders may be employed on each rotor but in the embodiment shown the plates are octagonal and eight work holders are carried by each rotor centrally of the flat edges of the plates. It will be understood, of course, that more or less than eight work holders could be employed but preferably each rotor carries an even number of work holders which are in pairs diametrically opposite to each other.

As shown in Figures 6 and 8, the work holders comprise short pieces of pipe 24 which are of an external diameter to fit between the plates 23 and of a length to project beyond the plates as shown. To hold the pipes 24 in place, each pipe may be formed in its sides at diametrically opposite points with openings or recesses to receive pins 25 which project through registering openings in the plates. Preferably the pins 25 are carried by leaf springs 26 anchored to the plates and urging the pins inward into the openings in the pipe. In this way work holders can easily be changed simply by pulling the pins 25 outward to disengage the holes in the pipes and pulling the pipes radially out between the plates. When a new work holder is inserted the springs 26 will force the pins 25 inward into the openings therein to hold the new work holders in place. Preferably the internal diameter of the pipes is slightly greater than the external diameter of the nipples to be threaded so that the nipples can fit freely into the pipes. For different size nipples pipes having the same external diameter and different internal diameters are employed.

The work pieces are adapted to be held in the pipes 24 with their ends projecting slightly beyond the ends of the pipes. To locate the work pieces each of the pipes is formed in its opposite sides with a series of openings 27 spaced axially along the pipes through which stop pins 28 may be inserted. By inserting the stop pins in the proper series of openings, nipples of any desired length can be accommodate. Preferably for longer nipples the plates 23 themselves are formed with openings 29 through which the stop pins 28 may be inserted. In this way with a relatively small compact rotor all nipple lengths from short nipples up to the maximum for which the machine is designed, can easily be accommodated.

For short nipples work holders as shown in Figures 14 and 15 may be employed in place of the pipes 24. As shown in this construction, cylindrical rods 31 may be inserted between the rotor plates 23 and secured in place by the pins 25 in the same manner as the pipes 24 are mounted. At their outer ends the rods 31 carry reduced pins 32 which are threaded to receive nuts 33 to function as adjustable stops. A short nipple, as shown at 34 in Figure 14, may be slipped over the pin 32 with its inner end resting against the adjustable stop 33 and will be carried by the rotor as it turns. It is noted that the pins 32 hold the nipples for radial sliding movement in the same manner as the pipes 24 but the pins are preferred for short nipples to provide greater accessibility for gripping.

The guard strips

To prevent the nipples from being displaced radially from the holders as the rotors turn, guard strips are provided adjacent the rotors as best seen in Figure 1. As shown, the upper rotor has a short arcuate guard strip 35 extending from a position near the top of the rotor to a position approximately 45° from the top as shown. This guard strip is mounted to move with the carriage by means of supports 36.

In the central part of the rotor no guard strip is carried by the carriage but a short arcuate guard strip 37 is mounted on the carriage near the lower right hand quadrant of the upper rotor as shown. The lower rotor is similarly provided with short arcuate guard strips 38 and 39 near its upper and lower parts respectively, which are secured to the carriage to move therewith. The guard strip 39 preferably extends beyond the bottom of the rotor to a position approximately 45° to the left of the bottom where the completed nipples are discharged.

Between the two rotors at the central point where work pieces transfer from the upper to the lower rotor, a vane 41 is provided pivoted at 42 near the ends of the guard strips 37 and 38. A counterweight 43 normally urges the vane 41 upward to the position shown where it forms a continuation of the lower guard strip 38.

As the rotors turn with work pieces in the work holders thereof, a work piece in the upper rotor as it turns clockwise, will engage the vane 41 and press it downward. When the work piece passes the vane the upper holders will be in vertical alignment with a holder on the lower rotor as shown in Figures 1 and 6, and the work piece will fall by gravity from the bottom holder in the upper rotor to the top holder in the lower rotor. When the rotors again turn clockwise, the work piece will pass under the vane 41 which has then swung up to the position shown, and will be held against accidental displacement by the vane 41 and the guard strip 38.

Between the ends of the guard strips which are movable with the carriage and in horizontal registry with the heads 12 and 13, stationary curved guard strips 44 are provided carried by the stationary frame. These guard strips form, in effect, continuations of the curved guard strips carried by the carriage and are open at their centers in alignment with the heads so that the work pieces and clamp jaws can pass through them into the heads.

To prevent the work pieces from accidentally moving through the openings in the guard strips 44, a shiftable shutter is provided formed by side strips 45, connected by cross plates 46. The side strips 45 are mounted for vertical sliding in the frame and the cross plates 46 are positioned so that when the shutter is in its lowered position, they lie in register with and close the openings through the guard strips 44 to hold the work pieces against accidental movement in the work holders.

When the work pieces are to be moved toward the heads the shutter is shifted upward to move the plates 46 away from the openings as described hereinafter. At this time the work pieces and clamp jaws can move freely through the openings for a threading operation.

The clamp jaws

Work pieces carried by the rotors in registry with the heads are gripped by clamp jaws carried by the carriage and held thereby during threading. As best seen in Figures 8 and 9, the carriage is formed at its forward end in alignment with the heads with enlarged block portions 48, which are bored out horizontally to receive cylindrical blocks 49 slidable horizontally toward and away from each other.

Each of the blocks 49 is formed at its forward end with a cross keyway to receive a corresponding keyway on a clamp jaw 51. The clamp jaws are held against accidental displacement by guide pins 52 which fit slidably into grooves in the upper and lower surfaces of the clamp jaws so that the jaws are guided for accurate horizontal movement into engagement with the work pieces. For close nipples the clamp jaws 51 may be provided with angular grooves to give the jaws a slight movement longitudinally of the nipples as they move in and out, this combined movement being generally parallel with the threads on the nipples as more particularly described and claimed in my co-pending application Serial No. 176,995, filed August 1, 1950.

At their opposite ends, the blocks 49 carry cam follower rollers 53 mounted on cross pins 54 in the blocks which extend through elongated slots in the housings 48. These pins thus keep the blocks 49 from turning and at the same time carry the cam follower rollers. Preferably, springs 55 act between the pins 54 and the housings to urge the jaws outward to nipple releasing position.

To enable the jaws to grip a nipple carried by a tube 24 the tubes are preferably cut away at their opposite sides as shown, to leave openings therein through which the jaws can project to engage a work piece. As seen in Figure 9, the jaws have gripping surfaces spaced approximately 90° and which are shaped to enter the cut out sides of the tubes and grip a work piece at four 90° spaced positions. Thus the jaws can grip the work piece within the work holder so that the work piece need project beyond the work holder only approximately the amount required to be threaded.

For short nipples as shown in Figures 14 and 15, the jaws as indicated at 51' may be internally threaded and may extend throughout substantially half a circle each. With the nipples carried on the pins 32 the fully periphery thereof is available for gripping by the jaws so that jaws having a greater arcuate extent can be used. This is highly desirable in the case of relatively small sizes although for all short nipples it presents some advantages.

The rotor and clamp jaw operating means

The rotors are turned and the clamp jaws for each rotor are operated by single motors which, as shown are fluid motors 56. Each fluid motor contains a piston having a piston rod 57 projecting therefrom which is connected to a slide 58 on the carriage. Each slide 58 terminates in a cam portion 59 which may be slidably keyed into the carriage frame to engage one of the cam follower rollers 53.

Each cam as best seen in Figure 8, includes a relatively long thin portion to be engaged by the roller 53 when the jaws are in their released position. When the cam is moved forward by extension of the fluid motor, the roller will engage an angular cam surface to move the jaw inward with a force dependent upon the cam angle and the force exerted by the motor.

The cam has an extension 61 thereon, carrying a roller 62 which fits into a peripheral notch 63 in a disc 64 which is connected to a through shaft 65. A sleeve 66 rotatable on the shaft 65, forms a hub for the rotor. The shaft 65 extends completely through the rotor and on the opposite side thereof carries a cam disc 67 as best seen in Figures 12 and 13. The cam disc is formed with a peripheral notch to receive a roller 68 carried by a rod 69 to operate a cam 71 on the opposite side of the rotor. The cam 71 is identical to the cam 59 and operates the other clamp jaw in synchronism with operation of the first clamp jaw by the cam 59.

The motor 56 also serves to turn the rotor in a step by step manner, and for this purpose a ratchet mechanism, as best seen in Figures 10 and 11, is provided. As shown, this mechanism comprises a pawl 72 pivoted on the disc 64 and urged upward by a spring 73. The pawl is adapted to engage a ratchet wheel 74 carried by the sleeve 66, and having a number of equally spaced teeth thereon corresponding to the number of work holders on the roller. As the motor 56 reciprocates, it preferably turns the disc 64 through an angle greater than the spacing of the ratchet teeth as indicated in Figures 10 and 11 to provide a lost motion between the pawl and ratchet for a purpose to appear more fully later.

To lock the rotor in the desired position registering with the head, a locking ratchet mechanism as shown in Figures 12 and 13, is provided. This mechanism includes a ratchet wheel 75 similar to the ratchet wheel 74, and also connected to the sleeve 66.

The carriage frame adjacent to the ratchet wheel 75 slidably carries a pair of locking pawls 76 which are normally urged inward to their locking position as shown in Figure 12, by springs 77. Each of the pawls 76 carries a roller 78 which engages the cam disc 67 as shown.

When the motor 56 is contracted the parts will occupy the positions shown in Figures 10 and 12. At this time, the locking ratchet holds the rotor against turning and the pawl 72 is in engagement with the ratchet 74 having just completed a turning stroke. When the motor is extended, it will turn the cam 67 toward the position of Figure 13, and after a relatively short movement the locking pawl 76 will be cammed back as shown in Figure 13. At the same time the pawl 72 will have been moved back to the position shown in Figure 11, beyond the next ratchet tooth. At the same time as the motor is extended the cams 59 and 71 will cam the clamp jaws inward to grip a nipple held in the horizontal position by a work holder.

In the next operation when the motor is again retracted, its first movement will release the clamp jaws and during this part of the movement the pawl 72 will move toward the next ratchet tooth but will not fully engage the teeth until the clamp jaws are completely released. Upon further movement, the pawl 72 will turn the ratchet 74 and the rotor through 45° to bring the next work piece into the horizontal position aligned with the head. After the pawl 72 has started to turn the ratchet 74, the cam 67 will release the latching pawls 76 which will then move inward to engage the ratchet 75. When the rotor has turned to the desired indexed position, the shoulders on the ratchet 75 will engage the latching pawls 76 as shown in Figure 12, to stop the rotor accurately in the desired position.

There is a separate motor 56 for each of the rotors so that each rotor is turned independently of the other, and the clamping jaws associated with each rotor are operated independently of the other. Thus, if there is any variation in the diameter of the work pieces, the work pieces in the different rotors will be tightly gripped. However, to prevent the rotors from getting excessively out of step with each other, a lost motion interconnection is provided between them.

As shown, each of the shafts 65 carries at its left end as seen in Figure 8, a crank arm 79 and the free ends of the crank arms are connected by a link 81. At, at least, one end the link 81 is connected to one of the crank arms through an elongated slot 82 which provides a limited degree of lost motion. Thus the rotors must necessarily turn approximately in step with each other, but sufficient lost motion is provided between them so that work pieces of slightly different sizes can be properly gripped.

*The carriage feeding means*

For threading nipples gripped by the jaws the carriage is preferably fed toward and away from the heads. It will be observed that the carriage and jaws in the mechanism shown, can be quite close to the heads so that only a very small movement is required before the heads engage the work pieces. It has been found that this motion can be on the order of ¼ inch so that the total travel of the carriage need be, at most, this relatively small movement plus the length of the threads.

To move the carriage, it is connected to a pull rod 83 which extends horizontally from the carriage between the heads as best seen in Figures 1 to 5. The pull rod 83 is connected to a cross bar 84 which has a pair of rods 85 connected thereto. The rods 85 are connected to a pair of chains 86 which extend over idler sprockets on the stationary frame and carry weights shown as pipes 87 and 88.

The pipe 88 preferably represents a relatively small weight and is readily secured to the chains 86 which pass loosely through the larger pipe 87. When the carriage is initially moved the weight of both pipes 87 and 88 is effective so that a relatively high force is applied to move the carriage rapidly and to press the work pieces into the heads with a relatively high pressure. Once the chasers have started to thread the work pieces, it is desirable to reduce the pressure to an amount approximately equal to the frictional forces involved so that the work pieces will move into the heads freely without throwing any load on the chasers.

For this purpose, fixed stops 89 are provided on the frame to engage the large weight 87 and make it ineffective after a predetermined movement of the carriage toward the heads. It will be understood that the value of the weights can easily be adjusted for different size nipples so that the optimum forces will be utilized at all times.

Figure 2:
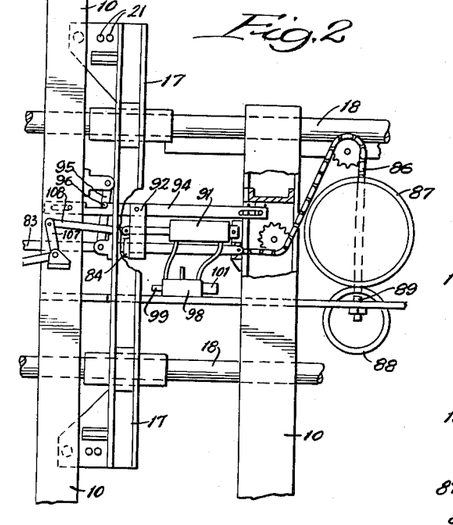
Figure 2 is a partial elevation with parts in section showing the carriage feeding mechanism in one position.
Figure 3:
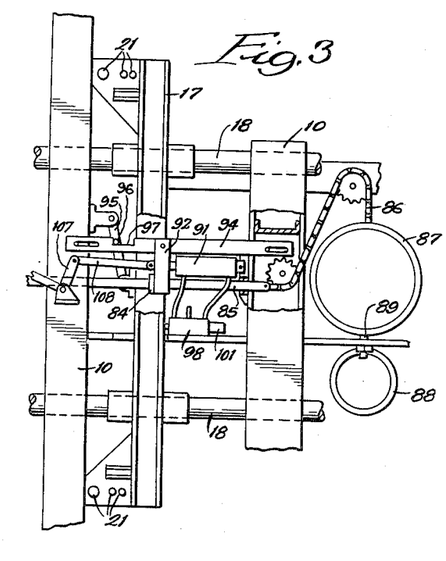
Figure 3 is a similar view showing the parts in a different position.
Figures 4, 5:
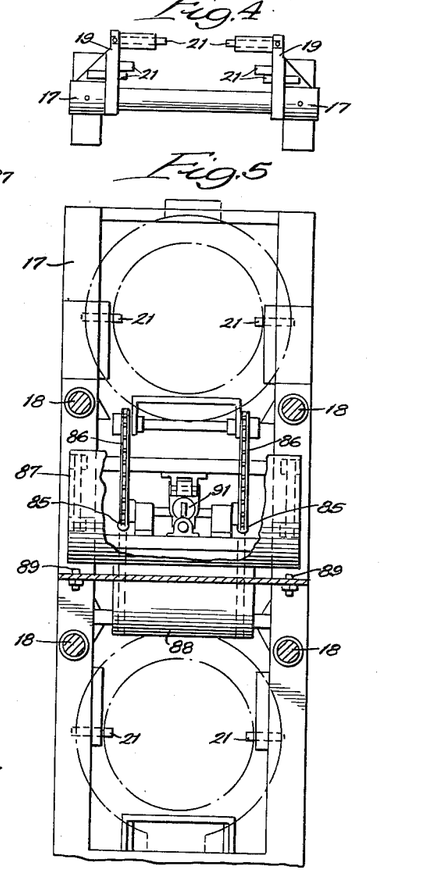
Figure 4 is a partial plan view of the head tripping bar.
Figure 5 is an end elevation with parts broken away showing the carriage feeding mechanism and the tripping bar.

To return the carriage, a fluid motor 91 is employed which is mounted on the frame and connected to a cross head 92. When the motor 91 is expanded as shown in Figure 2, the cross head 92 will engage the cross bar 84 and shift the carriage to the left away from the heads. When the motor is retracted as shown in Figure 3, the cross head 92 will move away from the cross bar 84 allowing the weights to shift the carriage toward the heads.

Movement of the carriage is also utilized to trip the heads and for this purpose the carriage is formed with adjustable projections 93 to engage the trip bar 17. The projections 93 can be set to trip the heads after the desired length of threads has been formed. As the carriage moves to the right as seen in these figures, the projections 93 will engage the trip bar 17 and move it to the right to trip the heads. The heads now being open the work pieces can be withdrawn axially therefrom without the necessity for unthreading them.

The motor 91 is adapted to shift the trip bar back to the left to reset the heads, and for this purpose a rod 94 is slidably mounted on the frame and is connected to the cross head 92 as shown. The trip bar is pivoted to the lower end of a link 95 whose upper end is pivoted to the frame. The link 95 intermediate its ends carries a pin 96 fitting into an elongated slot 97 in the rod 94.

When the motor 91 is expanded as shown in Figure 2, the right end of the slot will engage the pin 96 and shift the trip bar 17 to the left to close the heads. When the motor is contracted as shown in Figure 3, the pin 96 will move to the opposite end of the slot 97 but will not move the trip bar. Upon a return motion of the motor 91 to its expanded position it will first move the carriage sufficiently far to move the work pieces out of the heads before the right end of the slot 97 engages the pin 96 and returns the trip bar to close the heads.

*The controls*

To provide the desired automatic sequence of operations of the mechanism control switches are provided for the motors 56 and 91 which are the only motors required for operation of the machine other than the driving motor for the heads which functions continuously. The motor 91 is controlled by a valve 98 having fluid connections to opposite ends of the motor 91 to cause it to move in either direction. The valve is shifted in one direction by a pin 99 which is positioned to be engaged by a trip bar 17 when it is shifted to head tripping position.

In this position of the valve the motor is energized to expand to the position shown in Figure 2. The valve is shifted to its opposite position by a solenoid 101 to cause the motor to contract to the position shown in Figure 3. The solenoid 101 is controlled by a switch 102 (Figure 8) mounted on the frame to be engaged by a projection 103 on the slide 58 when the motor 56 is expanded. When the switch 102 is engaged by the projection 103 it will momentarily energize the solenoid 101 to shift the valve 98 to a position to retract the motor 91.

The motors 56 for controlling the rotors and jaws are controlled to move in one direction by a control valve or switch 104 (Figure 1) which is mounted on the frame to be engaged by the carriage when it returns to its retracted position remote from the heads. When the valve or switch 104 is engaged by the carriage it will operate the motors 56 to contract them to the position shown in Figure 8.

As the rotors turn and just before they reach their indexed position, one of the corners on the octagonally shaped plates will engage and operate a control valve or switch 105, which will reverse the motors 56 and cause them to expand. These few simple controls are all that are required for complete automatic operation of the apparatus.

*The shutter operating means*

The motor 91 is also utilized to move the shutter 45, 46 upward for a threading operation. For this purpose the side bars 45 are connected by a central operating strip 106 which overlies one end of a bell crank lever 107 pivoted at its center on the frame 10. The opposite end of the bell crank lever is connected to the cross-head 92 through a link 108.

When the motor 91 is retracted as shown in Figure 3, the bell crank will be rocked clockwise and its free end will engage the strip 106 to raise the shutter. In the raised position the plates 46 are completely above the openings in the guard strips 44 so that the work pieces and clamp jaws can move through the openings toward the heads. When the motor is expanded as shown in Figures 1 and 2 the bell crank lever will rock counterclockwise so that its free end will move downward away from the strip 106 and the shutter can drop to its lowered position.

To prevent the shutter from falling too rapidly so that the plates 46 might strike the newly threaded nipple and mar the threads, a time delay means is provided. As shown this means is a dash pot formed by a plate 109 secured between the lower ends of the side strips 45 and fitting slidably into a rectangular casing 111. A plate 112 formed with a fluid flow opening 113 closes the bottom of the casing 111 so that when the shutter moves up or down fluid will flow into or out of the casing through the opening 113 to restrict the rate of downward movement. The casing 111 is preferably mounted in an oil sump 114 at the bottom of the frame below the normal oil level therein so that the dash pot will be oil filled to increase its effectiveness over an air dash pot.

*Operation*

In operation, assuming that the heads are being driven and that work pieces are in the several holders on the rotors, a cycle may be considered to start with the parts in the position shown in Figure 1. At this time, the carriage has just been retracted from the heads by operation of the motor 91 and the uppermost work holder on the upper rotor is empty. A nipple blank may at this time be fed into the upper work holder and at the same time the blank in the lower work holder of the upper rotor, which has already been threaded on one end, will drop into the upper work holder on the lower rotor with its unthreaded end projecting.

As the rotors turned to the position shown, the control 105 was operated to energize both motors 56 so that they tend to expand. During this operation, the discs 64 and 67 turn clockwise from the positions shown in Figures 10 and 12 to the positions shown in Figures 11 and 13. At the same time the cams 58 and 71 move outward to cam the clamp jaws 51 to engage the work pieces held by the rotors at the horizontal positions in alignment with the heads.

As the clamp jaws move outward the projection 103 strikes the switch 102 and energizes the solenoid 101 to cause the motor 91 to contract. As soon as the cross head 92 moves away from the cross bar 84 the weights 87 and 88 start to shift the carriage toward the heads. After a predetermined initial movement sufficient to let the chasers cut at least on full turn in the nipple blanks the weight 87 engages the stop pins 89 and is therefore ineffective. The weight 88, however, continues to exert sufficient force on the carriage to overcome friction therein so that the threads will be cut smoothly.

After the threading has proceeded to the desired extent, the projections 93 will engage the trip bar 17 and trip the heads to open them. At the same time the trip bar 17 will engage the valve plunger 99 and shift the valve 98 to expand the motor 91. In its initial movement the cross head 92 engages the cross bar 84 to retract the carriage and toward the end of the motor movement the rod 94 will engage the pin 96 to shift the trip bar back to the left and close the heads ready for a subsequent operation.

When the carriage is fully retracted it engages the control 104 to energize the motors 56 which then contract to the position shown in Figure 8. During the retracting movement of these motors, the cams 59 and 71 first release the clamp jaws which move outward away from the work pieces. Thereafter the pawl 72 engages the ratchet 74 to turn the rotors. After initial movement of the rotors the latching pawls 76 move inward to engage the ratchet 75 and align the rotors properly in their new position. The parts are now back to the remote starting point with the upper holder on the top rotor ready to receive a new work piece blank and for the cycle to repeat. It will be seen therefore that as long as blanks are fed into the top holder on the upper rotor, the cycle will continue automatically to thread both ends of the blanks and to deliver the completed nipples at the lower left portion of the bottom rotor.

While one embodiment of the invention has been shown and described in detail, it will be understood that this is illustrative only and is not to be taken as the scope of the invention, reference being had for this purpose to the appended claims.

What is claimed is:

1. A feeding mechanism for nipple threading machines and the like, comprising a pair of transport rotors rotatable about vertically displaced horizontal axes, holders on the rotors to receive and hold work pieces to be machined, the holders being so spaced that the upper holder on the lower rotor will underlie the bottom holder on the upper rotor to receive a work piece therefrom, driving means to turn the rotors in a step by step manner, gripping jaws adjacent to the rotors to grip work pieces held thereby in a horizontal position, supporting means for the gripping jaws separate from the rotors and with respect to which the rotors are rotatable horizontal machining heads mounted in registry with the gripping jaws, and feeding means for moving the heads and gripping jaws relatively toward and away from each other.

2. A feeding mechanism for nipple threading machines and the like, comprising a pair of transport rotors rotatable about vertically displaced horizontal axes, holders on the rotors to receive and hold work pieces to be machined, the holders being so spaced that the upper holder on the lower rotor will underlie the bottom holder on the upper rotor to receive a work piece therefrom, driving means to turn the rotors in a step by step manner, gripping jaws adjacent to the rotors to grip work pieces held thereby in a horizontal position, horizontal machining heads mounted in registry with the gripping jaws, means separate from the rotors mounting the gripping jaws for horizontal movement toward and away from the heads, a pair of weights connected to the mounting means to urge it toward the heads, stop means to stop one of the weights after a predetermined movement whereby only the other weight is effective, and means to move the mounting means away from the heads.

3. A feeding mechanism for nipple threading machines and the like, comprising a pair of transport rotors rotatable about vertically displaced horizontal axes, holders on the rotors to receive and hold work pieces to be machined, the holders being so spaced that the upper holder on the lower rotor will underlie the bottom holder on the upper rotor to receive a work piece therefrom, driving means to turn the rotors in a step by step manner, gripping jaws adjacent to the rotors to grip work pieces held thereby in a horizontal position, horizontal machining heads mounted in registry with the gripping jaws, means separate from the rotors mounting the gripping jaws for horizontal movement toward and away from the heads, feeding means for moving the mounting means, a control device for the feeding means operated by movement of the mounting means a predetermined distance toward the head to move the mounting means away from the heads, a control device operated by movement of the mounting means away from the heads to control the driving means to turn the rotors, and a control device operated by movement of the driving means to cause the feeding means to move the mounting means toward the heads.

4. A feeding mechanism for nipple threading machines and the like, comprising a pair of transport rotors rotatable about vertically displaced horizontal axes, holders on the rotors to receive and hold work piece to be machined, the holders being so spaced that the upper holder on the lower rotor will underlie the bottom holder on the upper rotor to receive a work piece therefrom, driving means to turn the rotors in a step by step manner, gripping jaws adjacent to the rotors to grip work pieces held thereby in a horizontal position, horizontal machining heads mounted in registry with the gripping jaws, means mounting the gripping jaws and heads for relative horizontal movement toward and away from each other, feeding means for moving the mounting means, a control device for the feeding means operated by movement of the mounting means a predetermined distance toward the heads to move the gripping jaws and heads apart, a control device operated by movement of the mounting means a predetermined distance away from the heads to control the driving means to turn the rotors, cam means operated by the driving means to control engagement and disengagement of the gripping jaws, said last named cam means being operated by the driving means to disengage the gripping jaws before the driving means turns the rotors, and a control device operated by movement of the cam means in a direction to engage the gripping jaws to cause the feeding means to move the gripping jaws and heads relatively toward each other.

5. A feeding mechanism for nipple threading machines having a pair of vertically spaced horizontal heads comprising a carriage, a pair of transport rotors rotatable on vertically spaced horizontal axes on the carriage in horizontal alignment with the heads respectively, holders on the rotors defining open ended pockets loosely to receive work pieces and hold them with the end thereof to be worked on extending radially of the rotors, the holders being so spaced that an upper holder on the lower rotor is beneath a lower holder on the upper rotor to receive a work piece by gravity therefrom, two sets of gripping jaws carried by the carriage to grip work pieces in alignment with the heads respectively, and feeding means to move the carriage and heads relatively toward and away from each other.

6. A feeding mechanism for nipple threading machines having a pair of vertically spaced horizontal heads comprising a carriage, a pair of transport rotors rotatable on vertically spaced horizontal axes on the carriage in horizontal alignment with the heads respectively, holders on the rotors defining open ended pockets loosely to receive work pieces and hold them with the ends thereof to be worked on extending radially of the rotors, the holders being so spaced that an upper holder on the lower rotor is beneath a lower holder on the upper rotor to receive a work piece by gravity therefrom, two sets of gripping jaws carried by the carriage to grip work pieces in alignment with the heads respectively, driving means on the carriage to turn the rotors step by step, cam means operated by the driving means to operate the gripping jaws, and feeding means to move the carriage and heads relatively toward and away from each other.

7. A feeding mechanism for nipple threading machines having a pair of vertically spaced horizontal heads comprising a carriage mounted for horizontal movement toward and away from the heads, a pair of transport rotors rotatable on vertically spaced horizontal axes on the carriage in horizontal alignment with the heads respectively, holders on the rotors to receive work pieces and hold them with the ends thereof to be worked on extending radially of the rotors, the holders being so spaced that an upper holder on the lower rotor is beneath a lower holder on the upper rotor to receive a work piece by gravity therefrom, two sets of gripping jaws carried by the carriage to grip work pieces in alignment with the heads respectively, a pair of driving motors, means connecting the motors respectively to the rotors to turn the rotors step by step, cam means operated by the motors respectively to operate the gripping jaws, and feeding means to move the carriage toward and away from the heads.

8. A feeding mechanism for nipple threading machines having a pair of vertically spaced horizontal heads comprising a carriage mounted for horizontal movement toward and away from the heads, a pair of transport rotors rotatable on vertically spaced horizontal axes on the carriage in horizontal alignment with the heads respectively, holders on the rotors to receive work pieces and hold them with the ends thereof to be worked on extending radially of the rotors, the holders being so spaced that an upper holder on the lower rotor is beneath a lower holder on the upper rotor to receive a work piece by gravity therefrom, two sets of gripping jaws carried by the carriage to grip work pieces in alignment with the heads respectively, a pair of driving motors, means connecting the motors respectively to the rotors to turn the rotors step by step, cam means operated by the motors respectively to operate the gripping jaws, linkage embodying a lost motion connection connecting the motors to limit relative movement therebetween, and feeding means to move the carriage toward and away from the heads.

9. A feeding mechanism for nipple threading machines having a pair of vertically spaced horizontal heads comprising a carriage mounted for horizontal movement toward and away from the heads, a pair of transport rotors rotatable on vertically spaced horizontal axes on the carriage in horizontal alignment with the heads respectively, holders on the rotors to receive work pieces and hold them with the ends thereof to be worked on extending radially of the rotors, driving means to turn the rotor step by step so that in each step position the upper holder on the lower rotor will underlie the bottom holder on the upper rotor to receive a work piece therefrom, two sets of gripping jaws carried by the carriage to grip work pieces in alignment with the heads respectively, curved guard strips on the carriage overlying the holders to prevent accidental displacement of the work pieces from the holders, the guard strips being interrupted at the tops of the rotors and at the bottom of the upper rotor for vertical feed of work pieces into the upper rotor and from the upper rotor into the lower rotor, and the guard strips also being interrupted opposite to the heads for movement of the work pieces into the heads.

10. A feeding mechanism for nipple threading machines having a pair of vertically spaced horizontal heads comprising a carriage, means mounting the carriage and heads for relative horizontal movement toward and away from each other, a pair of transport rotors rotatable on vertically spaced horizontal axes on the carriage in horizontal alignment with the heads respectively, holders on the rotors to receive elongated work pieces and hold them with their axes extending radially of the rotors, driving means to turn the rotor step by step so that in each step position the upper hold on the lower rotor will underlie the bottom holder on the upper rotor to receive a work piece therefrom, two sets of gripping jaws carried by the carriage to grip work pieces in alignment with the heads respectively, curved guard strips on the carriage overlying the holders to prevent accidental displacement of the work pieces from the holders, the guard strips being interrupted at the tops of the rotors and at the bottom of the upper rotor for vertical feed of work pieces into the upper rotor and from the upper rotor into the lower rotor, there being openings in the guard strips in registry with the heads, a movable shutter having plates thereon to close the openings, and means to move the shutter to move the plates away from the openings when the rotors are stationary in a step position.

11. A feeding mechanism for a nipple threading machine having a pair of vertically spaced horizontal threading heads, an axially slidable tripping ring on each of the heads, a tripping bar connected to the tripping rings, a carriage slidable horizontally toward and away from the heads, gripping means on the carriage to hold work pieces for movement into the heads, tripping projections on the carriage to engage the tripping bar and trip the heads after a predetermined movement of the carriage toward the heads, and a motor controlled by movement of the tripping bar to a position to trip the heads to move the carriage away from the heads and to move the tripping bar to reset the heads.

12. A feeding mechanism for a nipple threading machine having a pair of vertically spaced horizontal threading heads, an axially slidable tripping ring on each of the heads, a tripping bar connected to the tripping rings, a carriage slidable horizontally toward and away from the heads, gripping means on the carriage to hold work pieces for movement into the heads, tripping projections on the carriage to engage the tripping bar and trip the heads after a predetermined movement of the carriage toward the heads, means to urge the carriage toward the heads, a reset motor controlled by movement of the carriage, a lost motion connection between the motor and carriage so that the motor will move the carriage away from the heads when the motor is moved in one direction and will leave the carriage free to be moved by the urging means when the motor is moved in the other direction, and a lost motion connection between the motor and the tripping bar to move the tripping bar to reset the heads when the motor is moved in said one direction.

13. The construction of claim 12 in which the urging means comprises two weights connected to the carriage and stop means to engage one of the weights and make it ineffective after a predetermined movement of the carriage.

14. A feeding mechanism for a nipple threading machine and the like having a pair of vertically spaced horizontal heads comprising a pair of transport rotors rotatable on vertically spaced horizontal axes, spaced radially extending work holders on the rotors to receive work pieces, adjustable stops on the holders to limit movement of the work pieces radially inward of the rotors, means to turn the rotors step by step so that a work piece fed into a holder at the top of the upper rotor will be carried around thereby and will fall by gravity into a holder at the top of the lower rotor, curved guard strips mounted adjacent to the peripheries of the rotors to prevent accidental outward displacement of the work pieces from the holders two sets of gripping jaws adjacent to the rotors to grip work pieces held thereby in a horizontal position, means separate from the rotors mounting the gripping jaws for movement toward and away from the heads, and means to move the gripping jaws and heads relatively toward and away from each other.

15. The construction of claim 14 in which the work holders are radially extending tubes to receive the work pieces and the stops are pins extending diametrically across the tubes.

16. The construction of claim 14 in which the work holders are radially extending pins over which tubular work pieces slidably fit and the stops are elements carried by the pins and projecting therefrom.

17. A feeding mechanism for a nipple threading machine and the like comprising a pair of transport rotors rotatable on vertically spaced horizontal axes, uniformly spaced radially extending work holders on the rotors to receive work pieces, adjustable stops on the holders to limit movement of the work pieces radially inward of the rotors, means to turn the rotors step by step so that a work piece fed into a holder at the top of the upper rotor will be carried around thereby and will fall by gravity into a holder at the top of the lower rotor, gripping jaws in horizontal alignment with work pieces held by the holders at a horizontal position, means to move the gripping jaws horizontally to move the work pieces held thereby toward and away from machining heads, and curved guard strips mounted adjacent to the peripheries of the rotors to prevent accidental outward displacement of the work pieces from the holders, the guard strips being formed with openings in registry with the gripping jaws through which work pieces held by the gripping jaws can move.

18. A feeding mechanism for a nipple threading machine and the like comprising a pair of transport rotors rotatable on vertically spaced horizontal axes, spaced radially extending work holders on the rotors to receive work pieces, adjustable stops on the holders to limit movement of the work pieces radially inward of the rotors, means to turn the rotors step by step so that a work piece fed into a holder at the top of the upper rotor will be carried around thereby and will fall by gravity into a holder at the top of the lower rotor, gripping jaws in horizontal alignment with work pieces held by the holders at a horizontal position, means to move the gripping jaws horizontally to move the work pieces held thereby toward and away from machining heads, curved guard strips adjacent to the peripheries of the rotors including fixed sections formed with openings in registry with the gripping jaws, a movable shutter having plates thereon to close the openings, and means to move the shutter to move the plates away from the openings.

19. A feeding mechanism for a nipple threading machine and the like comprising a pair of transport rotors rotatable on vertically spaced horizontal axes, spaced radially extending work holders on the rotors to receive work pieces, adjustable stops on the holders to limit movement of the work pieces radially inward of the rotors, means to turn the rotors step by step so that a work piece fed into a holder at the top of the upper rotor will be carried around thereby and will fall by gravity into a holder at the top of the lower rotor, gripping jaws in horizontal alignment with work pieces held by the holders in a horizontal position, means to move the gripping jaws horizontally to move the work pieces held thereby toward and away from machining heads, curved guard strips adjacent to the peripheries of the rotors to engage the work pieces and prevent accidental outward displacement thereof from the holders, the ends of the strips between the rotors terminating at points spaced laterally from the vertical plane of the rotor axes, a vane pivoted on a horizontal axis adjacent said ends of the strips and extending toward the plane of the rotor axes, and means yieldingly biasing the vane upward to form a continuation of the lower strip, the vane swinging downward when engaged by a work piece to form a continuation of the upper strip.

20. In a feeding mechanism for a nipple threading machine having a head rotatable on a horizontal axis, a carriage slidable horizontally toward and away from the head, a transport rotor on the carriage rotatable on a horizontal axis, a plurality of work holders on the rotor to receive work pieces and carry them around into alignment with the head, clamp jaws on the carriage in registry with the head to clamp a work piece and move it into the head, driving means on the carriage to turn the rotor and to operate the clamp jaws, feeding means to move the carriage toward and away from the head, control means operable by movement of the carriage a predetermined distance toward the head to cause the feeding means to move the carriage away from the head, control means operable by movement of the carriage a predetermined distance away from the head to cause the driving means to release the clamp jaws, turn the rotor and then re-engage the clamp jaws, and control means operable by movement of the driving means to re-engage the clamp jaws to cause the feeding means to move the carriage toward the head.

21. In a feeding mechanism for nipple threading machines and the like having a machining head, a rotatable transport rotor, a plurality of work holders on the transport rotor to receive work pieces and carry them around into registry with the head, clamp jaws mounted adjacent to the rotor in registry with the head, supporting means for the clamp jaws separate from the rotor and with respect to which the rotor is rotatable means to turn the rotor and to move the clamp jaws into gripping engagement with a work piece held thereby in registry with the head, and means to move the clamp jaws and the head relatively toward and away from each other.

22. In a feeding mechanism for nipple threading machines and the like having a machining head, a rotatable transport rotor, a plurality of work holders on the transport rotor to receive work pieces and carry them around into registry with the head, clamp jaws mounted adjacent to the rotor in registry with the head, means to turn the rotor and to move the clamp jaws into gripping engagement with a work piece held thereby in registry with the head, a curved guard strip around the rotor to prevent accidental displacement of work pieces from the holders and having an opening therein in registry with the clamp jaws and the head, a movably mounted plate to close the opening, and means to move the clamp jaws and head relatively toward and away from each other and to move the plate away from the opening in timed sequence.

23. In a feeding mechanism for nipple threading machines and the like having a machining head, a rotatable transport rotor, a plurality of work holders on the transport rotor to receive work pieces and carry them around into registry with the head, clamp jaws mounted adjacent to the rotor in registry with the head, means to turn the rotor and to move the clamp jaws into gripping engagement with a work piece held thereby in registry with the head, a curved guard strip around the rotor to prevent accidental displacement of work pieces from the holders and having an opening therein in registry with the clamp jaws and the head, a movably mounted plate to close the opening, means urging the clamp jaws and head relatively toward each other, a motor, means including a lost motion connection connected to the motor to move the clamp jaws and head relatively away from each other, and means connecting the motor to the plate to move the plate away from the opening when the motor moves in a direction, the driving connection moving the slidable cams to release the jaws before moving the second part into engagement with the first part to turn the rotor.

24. In a feeding mechanism for nipple threading machines and the like having a machining head, a rotatable transport rotor, a plurality of work holders on the transport rotor to receive work pieces and carry them around into registry with the head, clamp jaws mounted adjacent to the rotor in registry with the head, means to turn the rotor and to move the clamp jaws into gripping engagement with a work piece held thereby in registry with the head, a curved guard strip around the rotor to prevent accidental displacement of work pieces from the holders and having an opening therein in registry with the clamp jaws and the head, a movably mounted plate to close the opening, means urging the clamp jaws and head relatively toward each other, a motor, means including a lost motion connection connected to the motor to move the clamp jaws and head relatively away from each other, means directly connected to the motor and engageable with the plate to move it away from the opening when the motor moves in a direction to release the clamp jaws and head for movement relatively together in response to said urging means, the plate being yieldingly biased to a position to close the opening, and time delay means to delay movement of the plate to a position to close the opening when the motor moves in the other direction.

References Cited in the file of this patent

UNITED STATES PATENTS

| Re. 7,754 | Harvey | Mar. 27, 1877 |
| 590,463 | Plopper | Sept. 21, 1897 |
| 1,653,318 | Stickney | Dec. 20, 1927 |
| 1,748,540 | Curtis | Feb. 25, 1930 |
| 1,864,897 | Esing | June 28, 1932 |
| 1,934,568 | Stenman | Nov. 7, 1933 |
| 1,967,508 | Hibbard | July 24, 1934 |
| 2,116,639 | Protin | May 10, 1938 |
| 2,244,925 | Tyne | June 10, 1941 |
| 2,417,091 | Smith | Mar. 11, 1947 |
| 2,637,051 | Marsden | May 5, 1953 |